UNITED STATES PATENT OFFICE.

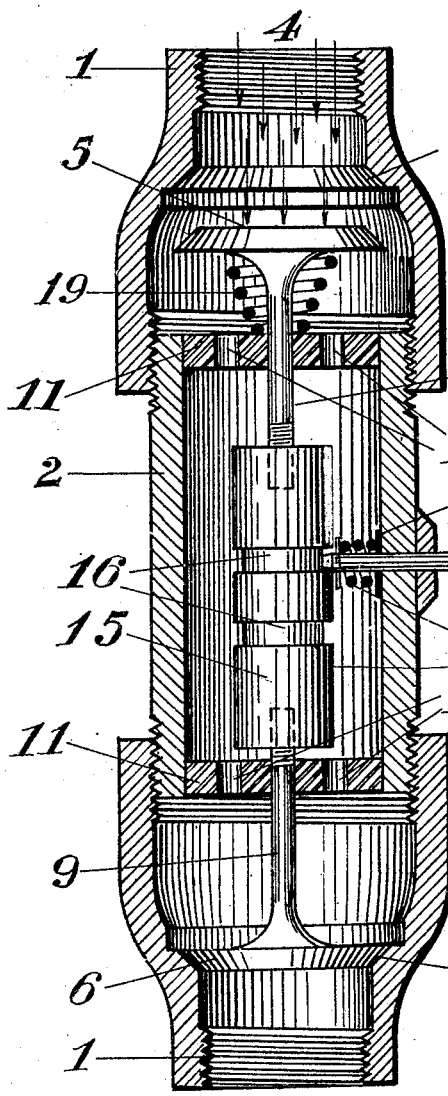
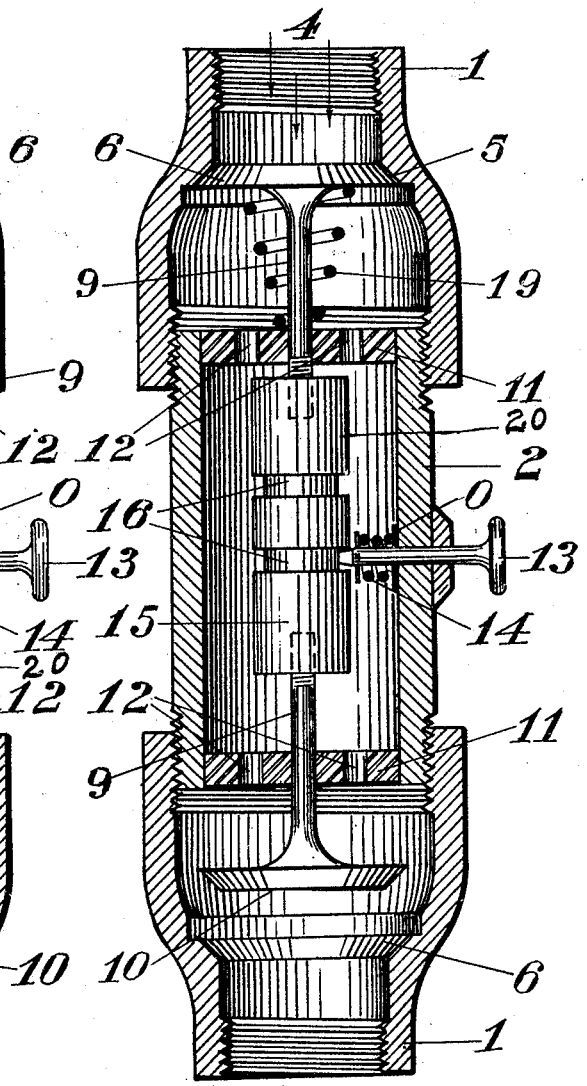

JOE COLLIER PALMER, OF FORT WORTH, TEXAS.

GAS VALVE.

1,410,218.　　　　Specification of Letters Patent.　Patented Mar. 21, 1922.

Application filed July 29, 1920. Serial No. 399,860.

*To all whom it may concern:*

Be it known that I, JOE COLLIER PALMER, a citizen of the United States, residing in Fort Worth, in the county of Tarrant and State of Texas, have invented a new and useful Gas Valve, of which the following is a specification.

My invention relates to improvements in gas valves, in which vertical reciprocating valves open and close supply and discharge pipes; and the object of my invention is to control the flow of gas in vertical pipes.

I attain this object by the mechanism illustrated in the accompanying drawing, in which—

Figure 1 is a vertical section of the entire device as it appears when the lower valve, or discharge pipe, is closed.

Figure 2 is a vertical section of the entire device as it appears when the upper valve, or supply pipe, is closed.

Similar numerals refer to similar parts throughout both figures.

A cylinder 2, with the heads 11 and the reducer 1 constitute the "housing" of the valve parts. The axis of the entire valve, when in operation, must be vertical; in this position, 4 is the supply end of the valve. The heads 11 are stationary in the cylinder 2 and constitute guides for the valve stems 9.

The valves 5 and 10, on their stems 9, are screwed into the ends of the small cylinder 15. The valve stems 9 move through and are guided in holes through the center of the heads 11. Around the cylinder 15 are two grooves 16 into which the conical point of the stem of a clamp screw 13 may be pressed by a small coil spring 14, Fitting around the stem of the clamp screw 13 and held in place by the spring 14, is a leather washer 0.

Around the valve stem 9 is a coil spring 19. Through the heads 11 are holes 12, to allow free passage of gas.

When the pressure of gas, entering through the supply pipe at 4, Figure 1, becomes excessive upon the valve surface 5, the spring 19 becomes compressed, the valve 10 is closed against its seat 6 and the spring 14 presses the point of the clamp screw 13 into the upper groove 16 of the cylinder 15.

The valve stem 9 should be so adjusted in the cylinder 15 that the conical point of the clamp screw 13 will press firmly against the lower rim of the groove in order to clamp the valve 10 in its closed position.

When the pressure of gas entering through the supply pipe at 4, Figure 2, becomes exceptionally light upon the valve surface 5 the upward lift of the spring 19 closes the face of the valve 5 against its seat 6 and the clamp screw 13 again locks the valve by its point being pressed into the lower groove 16 of the cylinder 15, the contact, in this instance, being on the upper rim of the groove.

The lock or catch 13 is set manually and while the gas is passing, the lock 13 is set on the part 20 of the cylinder 15 and stands normally in this position while the gas is passing at normal pressure. If the gas pressure on the valve 5 becomes too great, the valves 5 and 6 will be forced downwardly, the lock 13 sliding on the surface 20, until the valve 10 drops into seat 6. The gas will thus be cut off automatically and the lock 13 will drop in the upper groove 16 and thus lock the valve 10 closed. If the supply of gas becomes too weak, the spring 19 will force the valve 5 against the seat 6 automatically and the lock 13 will automatically drop in the lower groove 16 and thus lock the valve 5 closed. The danger of gas becoming too low to support combustion, causing the gas to stop burning, and afterwards, when pressure comes on, to escape into a room, is avoided. The danger of too much gas passing to the burner and overheating is avoided by the automatic closing of the valve 10 as above described.

I claim:

1. A gas control comprising a housing provided with openings at each end and valve seats adjacent the openings, valves oppositely disposed and adapted to engage said seats, a cylinder having peripheral grooves and movable longitudinally in said housing and valve stems adjustably connected to said cylinder for holding said valves in spaced relation to each other, guiding means for said valves, yielding means for automatically closing one of said valves when the gas pressure becomes too weak, and a spring-actuated detent for engaging one of said grooves.

2. A gas control comprising a housing provided with supply and discharge openings at opposite ends thereof, valve seats adjacent said openings, valves oppositely disposed and adapted to engage said seats, stems for said valves for adjusting said valves for determining the distance to be traveled by said valves, said valves standing open during normal pressure and the valve at the discharge opening being closed by abnormal pressure of the gas, a longitudinal cylinder carrying said stems and provided with peripheral grooves therein, and a spring-actuated detent adapted to engage one of said grooves for automatically locking the cylinder against movement.

3. A gas control comprising a housing provided with supply and discharge openings at opposite ends thereof, valve seats adjacent said openings, valves oppositely disposed and adapted to engage said seats, a cylinder movable longitudinally in said housing and stems for said valves adjustably connected to said cylinder for positioning said valves relative to each other and for determining the distance to be traveled by said valves, guiding means for said valves, yielding means for automatically closing the valve at the supply end of said housing when the gas pressure becomes too weak, and means for automatically locking said valve closed.

4. A gas control comprising a housing provided with supply and discharge openings at opposite ends for receiving the ends of a supply pipe for gas burners, valve seats adjacent said openings, valves oppositely disposed and adapted to engage said seats, a movable cylinder in said housing carrying said valves and for adjusting said valves relative to each other and provided with peripheral grooves, and a locking device adapted to engage either one of said grooves for locking one of said valves closed.

JOE COLLIER PALMER.